Figure 1:
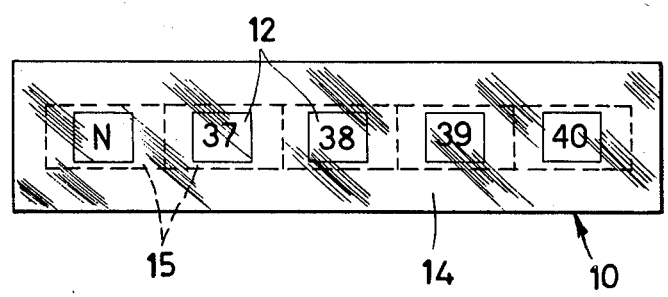

United States Patent [19]

Fraschini

[11] 4,138,889
[45] Feb. 13, 1979

[54] READY-READING, LIQUID-CRYSTAL-DISPLAY THERMOMETER

[75] Inventor: Mario Fraschini, Varese, Italy

[73] Assignee: Laboratorio Farmacologico Milanese S.n.c., Caronno Pertusella (Varese), Italy

[21] Appl. No.: 895,977

[22] Filed: Apr. 13, 1978

[30] Foreign Application Priority Data

Apr. 26, 1977 [IT] Italy ............................. 21200/77[U]

[51] Int. Cl.² ........................................... G01K 11/18
[52] U.S. Cl. ..................................... 73/356; 128/2 H
[58] Field of Search .......... 73/356; 116/114 V, 114.5; 128/2 H

[56] References Cited

U.S. PATENT DOCUMENTS

| 3,661,142 | 5/1972 | Flam | 128/2 H |
| 3,704,625 | 12/1972 | Seto | 73/356 |

Primary Examiner—S. Clement Swisher
Attorney, Agent, or Firm—Oblon, Fisher, Spivak, McClelland & Maier

[57] ABSTRACT

A strip thermometer of the liquid-crystal type for clinical use is disclosed, in which the melting point of the liquid crystals in the several display points of the strip is the temperature of an easily accessible area of the patient's body, the scale of the digital values being shifted so as to indicate the temperature of another area of the patient's body which corresponds to the temperature which is read out in the part of the body wherein the temperature readings are actually taken.

2 Claims, 2 Drawing Figures

READY-READING, LIQUID-CRYSTAL-DISPLAY THERMOMETER

This invention relates to a thermometer, more particularly a thermometer for reading the temperature of the human body.

The disturbances inherent in the use of the conventional thermometers for clinical use are well known and are principally connected with the high brittleness of such thermometers.

The properties of sensitivity to temperature of the so-called cholesteric liquid crystals are likewise known. Although such properties had been discovered only at the beginning of the present century, it is only in recent years that the applications of such cholesteric liquid crystals for measuring temperatures have gained momentum, principally in connection with spatial navigation applications.

It is to added to the foregoing considerations that it is possible to prepare compositions with different cholesteric crystals which are responsive to preselected temperature intervals, as desired.

Such compositions have found applications in thermometers for reading the temperature of rooms as well as for effecting thermographic assays on the human body. It is well known, in fact, that in connection with pathological conditions or functional alterations, the temperature of a few parts of the body varies considerably.

It has not been possible heretofore, however, to provide thermometers for measuring the body temperature and more particularly a thermometer which is capable of displaying with an adequate accuracy the body temperature in connection with febrile conditions, so as to replace the common mercury thermometers satisfactorily.

Among the shortcomings and defects of the conventional thermometers, in addition to the brittleness, there can be listed the comparatively high inertia and the necessity of sterilization to enable the thermometer to be used for a number of patients.

As regards the liquid-crystal thermometers, there have been provided heretofore only types which are capable of displaying the existence of fever, but without indicating accurately the temperature of the body.

The principal difficulty which has been dealt with in an attempt to exploit compositions based on liquid crystals for measuring febrile states lies just in the comparatively high temperature differential between different parts of the human body, this being a phenomenon which is known when measuring with the conventional thermometers the internal and the external temperature.

The principal object of the present invention is to provide a thermometer for reading out the body temperature, this instrument being based on compositions of liquid crystals and capable of giving a sufficiently accurate indication of the temperature, having a good promptness and being easily readable while permitting that an easily accessible portion of the body be used, preferably the patient's forehead.

In connection with these facts, it is appropriate to remember that the medical and clinical practice has always made reference and still so does, to body temperatures read in the armpit and groin regions, the forehead temperature being different from those read out in those regions, sometimes considerably.

This object is achieved by a thermometer of the kind comprising a supporting member of transparent plastics material, fitted with a coating formed by discrete areas of compositions of liquid crystals which are responsive to the preselected and desired temperature intervals, said areas being masked, in turn, by a contrast layer, said thermometer being characterized in that said areas, in which the individual compositions of liquid crystals of cholesteric nature are so shaped that, when activated, give a digital value, are identified by numbers which correspond to the usual indications of the body temperature of the conventional clinical thermometers, but the relative compositions of liquid crystals are responsive to different temperatures, that is to the temperatures which, for a determined area of the human body, such as the forehead, correspond to the temperatures which would be read out in the armpit area or otherwise.

By so doing, the usual indications as given by the conventional clinical thermometers are maintained while exploiting in a thorough manner the promptness and the convenience of the liquid crystal thermometers and their infrangibility as well.

In the accompanying drawings, in which

FIG. 1 is a plan view of a thermometer according to the invention and

Figure 2:
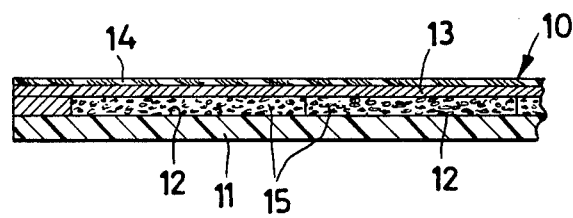

FIG. 2 is a cross-sectional view, a thermometer, 10, is shown, which is composed by a supporting member 11 of a plastic material which is both transparent and pliable, preferably a polyester resin known in the trade as Mylar, the rear face of which has window 12 formed therethrough which correspond to the digital displays which, as is common pratice, indicate the values from 35° C.–36° C. (as represented by the letter N, for "normal") to 40° C.–42° C.

In correspondence with such windows, there are formed with the known methods, the digital indications, with transparent digits on a dark background.

On the windows is applied, still in correspondence with the rear surface of the transparent supporting strip, a layer of cholesteric liquid crystals in a microencapsulation form, admixed with a glue, for example of the vinyl resin type. In this connection it is to be observed that the microencapsulation procedures for liquid crystals of cholesteric nature are well known in the art so that no further details are given herein. The characteristic of such microencapsulated liquid crystals is that they remain transparent until the temperature reaches a preselected value, which varies according to the composition, in correspondence with which the composition takes a certain colour, or, more exactly, passes through a series of colours corresponding to a certain temperature interval the central point of which corresponds to the preselected temperature value.

In the drawing, the layer of liquid crystals is indicated at 15, whereas the numeral 13 is the very dark masking layer applied above the layer of microencapsulated liquid crystals, for example a black varnish coating having a high masking power.

It is also provide for applying an additional layer 14 which improves the adhesion of the thermometer strip to the part of the human body on which the temperature readings are taken, said layer being also intended to offer an improved protection for the layer of liquid crystals and facilitates, in addition, the cleaning of the thermometer.

By way of example, when the thermometer strip is intended for being used on the patient's forehead, the compositions of encapsulated cholesteric liquid crystals applied to the several windows 12 shall be so selected as to change their colour at a temperature which is about 2° C.–3° C. below the corresponding armpit temperature. Stated another way, in correspondence with a window which displays a temperature of 38° C., there will actually be applied a composition of liquid crystals which changes its state at a temperature of 35° C.–36° C.

The invention has been described in connection with a preferred embodiment, being it understood that modifications and changes of a non conceptual nature can be carried out without departing from the scope of this invention.

I claim:

1. A thermometer for clinical use, of the type comprising a supporting member of a transparent plastics material, having windows in correspondence with which digital indications are applied which can be viewed by transparency, each window being coated by a composition of microencapsulated cholesteric liquid crystals sensitive to a pre-selected temperature, the layer of microencapsulated liquid crystals being coated, in its turn, by a very dark masking layer, characterized in that the compositions of liquid crystals are so preset as to change their state at a temperature different from that indicated by the digital corresponding value, that is, to change their state at the temperature that the body area on which the readings are taken actually has when the armpit or the groin region has the temperature displayed by the digital value.

2. A thermometer for clinical use according to claim 1, characterized in that said body area on which temperature readings are taken is the patient's forehead and the liquid crystal compositions are preset to change their state at a temperature which is exceeded by 2° C.–3° C. (temperature differential) by the corresponding displayed digital value.

* * * * *